US009105186B2

(12) United States Patent
Gayraud et al.

(10) Patent No.: US 9,105,186 B2
(45) Date of Patent: Aug. 11, 2015

(54) METHOD FOR AIDING THE TAXIING OF AN AIRCRAFT

(75) Inventors: Pascal Gayraud, Toulouse (FR); Nicolas Marty, Saint Sauveur (FR); Julia Percier, Cugnaux (FR)

(73) Assignee: Thales, Neuilly Sur Seine (FR)

(*) Notice: Subject to any disclaimer, the term of this patent is extended or adjusted under 35 U.S.C. 154(b) by 899 days.

(21) Appl. No.: 12/640,106

(22) Filed: Dec. 17, 2009

(65) Prior Publication Data

US 2010/0204909 A1    Aug. 12, 2010

(30) Foreign Application Priority Data

Dec. 19, 2008  (FR) ...................................... 08 07218

(51) Int. Cl.
*G06F 19/00* (2011.01)
*G05D 1/00* (2006.01)
*G08G 5/06* (2006.01)
*G08G 5/00* (2006.01)

(52) U.S. Cl.
CPC .............. *G08G 5/065* (2013.01); *G05D 1/0083* (2013.01); *G08G 5/0013* (2013.01); *G08G 5/0043* (2013.01)

(58) Field of Classification Search
CPC ... G08G 5/0013; G08G 5/0043; G08G 5/065; G05D 1/0083
USPC ............ 701/120; 244/50, 58; 60/802; 290/55
See application file for complete search history.

(56) References Cited

U.S. PATENT DOCUMENTS

| | | | |
|---|---|---|---|
| 5,855,340 A | | 1/1999 | Bacon |
| 7,050,909 B2* | | 5/2006 | Nichols et al. ................ 701/301 |
| 7,343,229 B1* | | 3/2008 | Wilson ............................. 701/15 |
| 7,802,757 B2* | | 9/2010 | Dooley et al. .................... 244/60 |
| 8,112,186 B2* | | 2/2012 | Sylvester ........................... 701/3 |
| 2003/0160708 A1* | | 8/2003 | Knoop ............................ 340/958 |
| 2005/0234609 A1* | | 10/2005 | Villaume et al. ................. 701/15 |
| 2009/0018713 A1* | | 1/2009 | Coulmeau et al. ................. 701/3 |
| 2009/0072080 A1* | | 3/2009 | Bhargava .......................... 244/58 |
| 2009/0115637 A1* | | 5/2009 | Naimer et al. .................. 340/979 |

(Continued)

FOREIGN PATENT DOCUMENTS

WO    WO 2007053932 A1 *  5/2007
WO    WO 2008043763 A1 *  4/2008

OTHER PUBLICATIONS

G Radnoti, "Profit strategies for air transportation", Mcgraw-Hill Education, Jan. 2002, pp. 217-218.

*Primary Examiner* — Tuan C. To
(74) *Attorney, Agent, or Firm* — LaRiviere, Grubman PC

(57) ABSTRACT

The invention relates to a method for aiding the taxiing of an aircraft comprising a plurality of onboard propulsion means and which is able to move over an airport zone according to at least one specific taxiing procedure making it possible to reduce fuel consumption, the method being characterized in that it implements the following steps during the phase of taxiing of the aircraft on an airport:

Checking of the taxiing conditions for the implementation of the said taxiing procedure and calculation of the implementation parameters of the procedure, Calculation of the taxiing performance data resulting from the implementation of the taxiing procedure, Display of the taxiing directives and performance related to the taxiing procedure, Monitoring of the parameters of the avionics systems during the implementation of the taxiing procedure.

The invention applies to taxiing plan formulation systems and/or aircraft monitoring systems.

9 Claims, 2 Drawing Sheets

(56) References Cited

U.S. PATENT DOCUMENTS

2009/0248398 A1* 10/2009 Aviran et al. .................. 704/9
2010/0324807 A1* 12/2010 Doose et al. .................. 701/120
2011/0125400 A1* 5/2011 Michel et al. .................. 701/208

* cited by examiner

METHOD FOR AIDING THE TAXIING OF AN AIRCRAFT

PRIORITY CLAIM

This application claims priority to French Patent Application Number 08 07218, entitled Method for Aiding the Taxiing of an Aircraft, filed on Dec. 19, 2008.

FIELD OF THE INVENTION

The field of the invention relates to aid for the taxiing of an aircraft, particularly for employing a specific taxiing procedure making it possible to reduce the aircraft's fuel consumption on the ground.

BACKGROUND OF THE INVENTION

To respond to issues of an economic and ecological nature, airlines are seeking to decrease aircraft fuel consumption. With this aim, they are asking constructors to provide technological solutions making it possible to design aircraft that consume less fuel but are also asking them about solutions for operating their air fleet that make it possible to reduce fuel consumption. With this objective, several taxiing procedures exist which are intended to reduce fuel consumption.

A first procedure consists for example in taxiing under certain conditions with a smaller number of engines than the number of engines of the aircraft, for example on a single engine for an aircraft with two engines or on two engines for an aircraft with four engines. For example, for a twelve-minute airport taxiing procedure, the saving in fuel is about 40 Kg for a short- or medium-haul twin-jet and 100 Kg for a long-haul twin-jet. For a company operating a sizable fleet of aeroplanes, the operating costs can be significantly reduced, especially within the context of the high petroleum price.

However, limitations exist for reasons of lifetime of the propulsion means and of procedure of use before a takeoff phase and of use after the landing phase. The taxiing procedure based on a reduced number of propulsion means is also not recommended for a heavy weight. It can also give rise to accelerated wear of the brakes, be prohibited on certain airports due to the damage caused by the blast of the engine which is stronger. Moreover for redundancy reasons, the taxiing procedure must be applied with the Auxiliary Power Unit (APU).

A second procedure consists in taxiing by means of a towing vehicle. The propulsion means must however be started up or shut down according to a particular procedure dependent particularly on minimum operating time before and after takeoff and landing.

A third procedure also exists, conceivable for the future, consisting in taxiing by means of an external electric motor positioned on the aircraft. For the same reasons as the previous procedure, the pilot must comply with a specific taxiing procedure dependent on the conditions of use of the onboard propulsion means and must in the case of this procedure also take into account the conditions of use of the electric motor.

Consequently, the application of the various taxiing procedures requires the checking of several implementation conditions.

SUMMARY OF THE INVENTION

The objective of the invention is to provide a decision aid for the application of a taxiing procedure using a reduced part of the aircraft's propulsion means when the said aircraft is moving over the ground. More precisely, the invention is a method for aiding the taxiing of an aircraft comprising a plurality of onboard propulsion means and which is able to move over an airport zone according to at least one specific taxiing procedure making it possible to reduce fuel consumption, the said procedure being restricted by taxiing conditions and defining taxiing directives in such a way that the aircraft moves by means of a reduced part of the said propulsion means or of propulsion means external to the aircraft. The method comprises the following steps during the phase of taxiing of the aircraft on an airport:

Checking of the taxiing conditions for the implementation of the said taxiing procedure and calculation of the implementation parameters of the procedure, Calculation of the taxiing performance data resulting from the implementation of the taxiing procedure, Display of the taxiing directives and performance related to the taxiing procedure, Monitoring of the parameters of the avionics systems during the implementation of the taxiing procedure.

The propulsion means which are not used during the taxiing procedure are of the same type of the propulsion means which are used during the taxiing procedure.

The method according to the invention makes it possible to alleviate the problems cited above. The expression specific taxiing procedure is understood to mean any specific movement procedure for the aircraft making it possible to reduce fuel consumption during the taxiing phase. It relates particularly to the taxiing procedures described above.

The method is implemented only if the scheduled taxiing time is sufficiently long to afford a beneficial saving through a decrease in fuel consumption. If the taxiing time is sufficiently long, the method for aiding taxiing furthermore provides the crew with indications about the benefit of employing the taxiing procedure and about the behaviour of the avionics systems during this procedure, notably the propulsion means. The propulsion means must indeed be in operation for a minimum time before takeoff and after takeoff to adhere to the procedures of use. The implementation parameters of the taxiing procedure comprise at least data regarding taxiing time according to the specific taxiing procedure.

In one mode of implementation of the method for aiding taxiing, the taxiing conditions comprise at least the conditions for implementing the taxiing procedure, the aircraft's configuration data, the parameters of the aircraft's avionics systems.

If the aircraft moves with a reduced part of propulsion means, the method checks the state of the said propulsion means, notably to assure the pilot that taxiing on a reduced number of engines will not cause damage to the avionics systems.

The method makes it possible to detect whether the configuration of the aircraft complies with the procedure, particularly in respect of the weight of the aircraft.

Before the execution of the taxiing procedure, the method calculates the taxiing performance data, these data comprising at least the data regarding saving in fuel consumption of the aircraft and provides the crew with an indication about the said saving in fuel consumption. Advantageously, the method is implemented for a plurality of specific taxiing procedures and the taxiing performance data, notably regarding saving in fuel consumption, are displayed for each of the specific taxiing procedures. This information makes it possible notably to prompt the pilot to employ a specific taxiing procedure.

During the execution of the procedure, the method displays the taxiing directives, these taxiing directives comprising at least data regarding taxiing time according to the specific taxiing procedure, location points for deactivating part of the propulsion means and location points for activating part of the propulsion means. During the execution of the procedure, the monitoring function alerts the pilot of a risk of damage to the systems and thus allows him to anticipate any incident.

The method is advantageous since it makes it possible to check that the specific taxiing procedure is implemented under the appropriate conditions of the aircraft as well as its configuration. In the converse case, alarms can be triggered.

Another advantage is that the method also makes it possible to aid the pilot in respect of the piloting of the aircraft during the procedure by presenting the location points for stopping and starting the propulsion means for example.

According to the various possible taxiing procedures, the method displays the saving in fuel consumption to the pilot for each procedure and thus gives him an indication prompting him to employ this procedure.

BRIEF DESCRIPTION OF THE DRAWINGS

The invention will be better understood and other advantages will become apparent on reading the description which follows given without limitation and by virtue of the appended

DETAILED DESCRIPTION OF PREFERRED EMBODIMENT

The method for aiding taxiing on airport zones is employed on aircraft comprising a plurality of propulsion means, notably twin jet and four-jet commercial aeroplanes. The method address for aircrafts which comprise the same propulsion means. They are of the same type and deliver the same propulsion's power symmetrically in normal conditions of navigation and taxiing. The aim of the method is to control differently the propulsion means which are normally controlled with the same commands in order to reduce the consumption. For a twin jet aeroplane, the method allows to control only the left engine or only the right engine. For a four jet aeroplane, the method allows aiding taxiing for the procedure which controls only one engine of each side of the aeroplane, or two engines of the left side or of the right side, or only one engine of the left side or one engine of the right side.

Within the context of a taxiing procedure using a reduced part of the propulsion means, the aircraft is propelled in the first case with a single jet while in the second case it is propelled with two jets.

A taxiing procedure cited above is implemented by means of an auxiliary electric propulsion system positioned preferably level with the landing gear. In that case, the entirety of the propulsion means of the aircraft are shut down and the aircraft moves solely by means of the electric propulsion system. The method can also be employed for this type of application, the taxiing conditions then also taking into account the conditions of use of the electric propulsion means.

Figure 1:
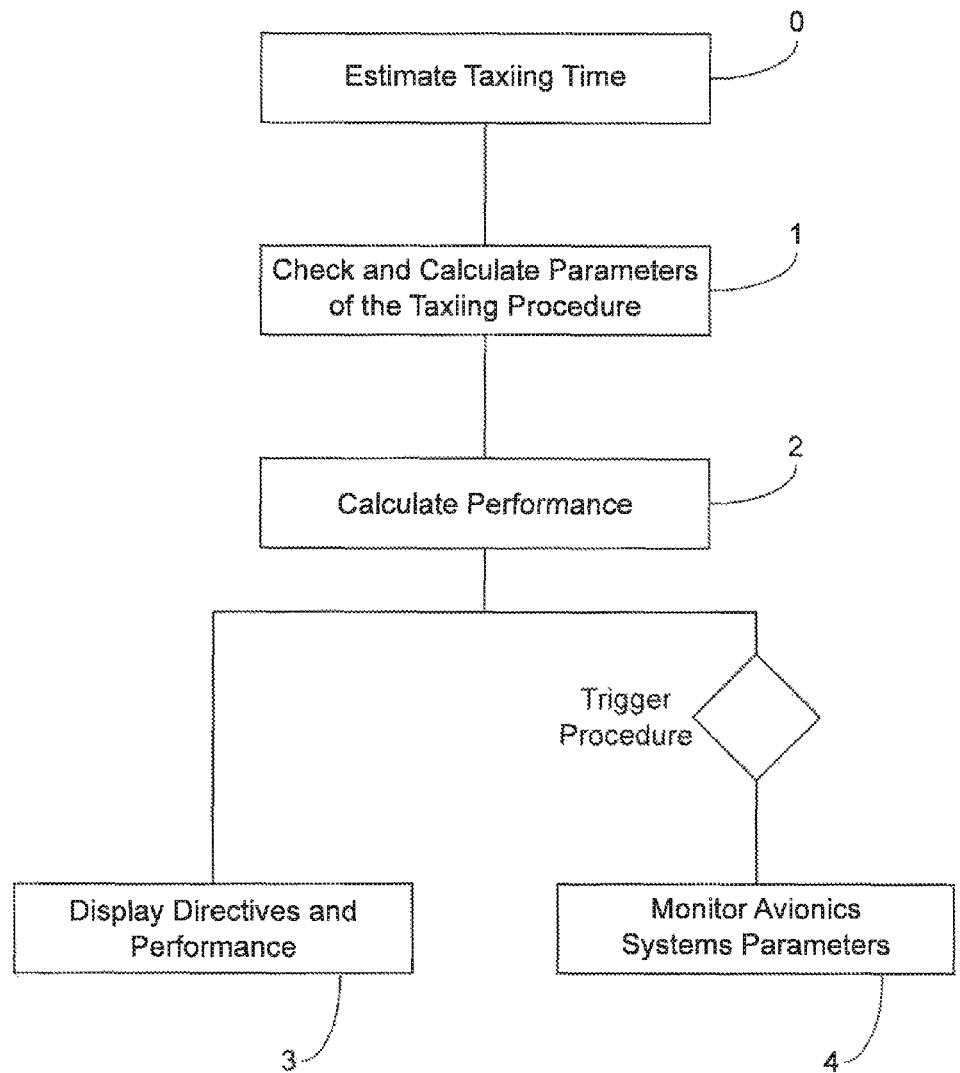
FIGS. 1, 2a, and 2b represent an execution diagrams of the method for aiding navigation.
Figure 2A:
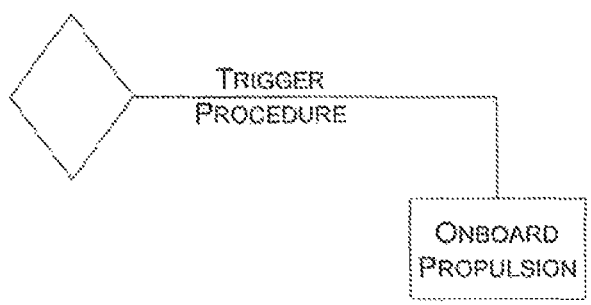
Figure 2B:
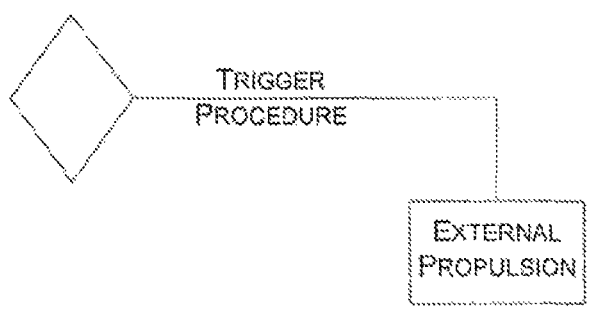

FIGS 1, 2a, and 2b represents an execution diagrams of the method for aiding taxiing. In an initial step 0, the method evaluates the taxiing time for the taxiing procedure for reaching the takeoff runway and for the taxiing procedure after landing. The estimation of this taxiing time is necessary for determining whether the specific taxiing procedure is applicable. The estimation of the taxiing time can be provided by the navigation management system, notably by the taxiing management function, or by the estimated takeoff data, or indirectly by an estimation of fuel consumption for taxiing in combination with a consumption chart for the aircraft's configuration data or by the data regarding taxiing on a specific airport, the identifier of the airport being obtained by the navigation management system.

In a second step, step 1 in the diagram, the method checks the taxiing conditions for the implementation of the specific taxiing procedure and calculates implementation parameters of the procedure. The taxiing conditions comprise at least the conditions for implementing the taxiing procedure, the aircraft's configuration data, the parameters of the aircraft's avionics systems. These taxiing conditions comprise at least the data regarding:

Estimation of the taxiing time: these data make it possible to determine the saving in fuel consumption and whether the procedure is compliant with the minimum operating time of the propulsion means before the takeoff procedure or after the landing procedure.

Procedure applicable on the airport: these data make it possible to detect for example whether the required speed of movement of the aircraft on the taxiways can be implemented with for example reduced propulsion means, and also provide the list of airports where the procedure can be applied.

Minimum taxiing time with the entirety of the propulsion means: these data relating to the propulsion means provide an indication of time limitation for shutting down the propulsion means and for starting up these same means.

Parameters of the avionics systems: for example the data indicating whether the APU is in operation, the state of the braking systems, aircraft weight, the preferentially stopped propulsion means, etc.

The taxiing plan: these data indicate the trajectory of the aircraft on the ground and whether the manoeuvres to be implemented can be carried out with a reduced number of propulsion means, notably in respect of performing turns.

The function for checking all these taxiing condition data makes it possible to determine whether the taxiing procedure can be employed with a reduced number of propulsion means without damage to the avionics systems and whether it is possible for the aircraft to taxi according to the taxiing trajectory defined by the airport's procedures with these same propulsion means. The checking of these conditions also makes it possible to calculate the implementation parameters of the taxiing procedure. The function determines notably the taxiing time with the reduced propulsion means for the dedicated procedure.

In a third step, step 2, this time is compared with the aircraft's configuration data and if it is greater than the minimum time required for the taxiing procedure, the method calculates the reduction in the aircraft's fuel consumption relative to a taxiing procedure with all the propulsion means available. The consumption reduction calculation is implemented by means of performance charts of the aircraft configuration databases. The method calculates taxiing performance data comprising at least the fuel consumption reduction data. In the case of the taxiing procedure when the aircraft is propelled with a reduced part of the propulsion means, the method calculates the minimum turning radius when the aircraft is propelled with a reduced part of the propulsion means.

As illustrated in step 3 of FIG. 1, the method for aiding taxiing displays the directives for applying the taxiing procedure as a function of the implementation parameters of the procedure that were calculated in the second step and the taxiing performance data. The taxiing directives comprise at least:

Data regarding taxiing time with a reduced part of the said propulsion means,

Location points for deactivating part of the propulsion means,

Location points for activating part of the propulsion means.

The data regarding the location points are displayed for example on a viewing device representing a map of the airport and can also be displayed on the pilot's taxiing plan. The taxiing plan is displayed on map display means and also by a series of textual instructions. In the latter case, the taxiing plan indicates the steps of stopping or of operating the propulsion means.

The data regarding minimum taxiing radius can be transmitted to the computer of the taxiing plan so that the pilot can identify the part of the taxiing route that cannot be accomplished according to the taxiing procedure using a reduced part of the propulsion means.

As illustrated in step 4 of FIGS. 1, 2a, and 2b, the method implements a monitoring of the taxiing procedure in the case where the pilot triggers a specific taxiing procedure, this procedure possibly being a taxiing with a reduced number of propulsion means or with external propulsion means. The aim of this step is to ensure that the pilot applies the procedure under the compliant taxiing conditions and that application thereof is adhered to. This function checks the state of the propulsion means and trips alerts in the event of a risk of damage to the systems.

The functions of the taxiing method can be integrated in a first mode of configuration into the taxiing plan management functions. The monitoring function can be integrated into an overall monitoring system encompassing the fields of traffic anticollision, terrain, meteorology for example. In another mode of implementation, the method for aiding taxiing according to the invention is an autonomous method.

The method for aiding taxiing can be a function integrated into the flight management system of an aircraft. The indications intended to be communicated to the pilot are displayed on the viewing devices and/or indicated by the alarm systems.

The invention claimed is:

1. A computer-aided method for reducing fuel consumption during the taxiing of an aircraft having an on-board computer processor, a display, and a plurality of onboard propulsion means, whereby the aircraft is able to move over an airport taxi zone according to at least one specific taxiing procedure, the procedure being restricted by taxiing conditions and defined taxiing directives for moving the aircraft by means of a reduced portion of the onboard propulsion means, the method comprising the following steps:

checking of the taxiing conditions for implementation of the taxiing procedure and calculation of the implementation parameters of the procedure, the parameters comprising taxiing time according to the specific taxiing procedure;

calculating taxiing performance data resulting from the implementation of the taxiing procedure, the performance data comprising an amount of reduced fuel consumption of the aircraft as a function of the taxiing time;

rendering on a display screen for a user the taxiing directives and the taxiing performance data related to the taxiing procedure;

monitoring the parameters of the avionics systems of the aircraft during the implementation of the taxiing procedure; and rendering on a display screen for a user the taxiing directives and the taxiing performance data related to the taxiing procedure.

2. Method according to claim 1, wherein the taxiing directives comprises:

data regarding taxiing time according to the specific taxiing procedure;

location points for deactivating part of the propulsion means; and location points for activating part of the propulsion means.

3. Method according to claim 2, wherein the parameters of the avionics systems comprise at least the data regarding the state of the propulsion systems.

4. Method according to claim 3, wherein the taxiing conditions comprise the conditions for implementing the taxiing procedure, the aircraft's configuration data, and parameters of the aircraft's avionics systems.

5. Method according to claim 1, wherein the propulsion means which are not used are of the same type as the propulsion means which are used.

6. Method according to claim 1, wherein the method is implemented for a plurality of specific taxiing procedures, whereby the taxiing performance data are displayed for each of the specific taxiing procedures.

7. A computer-aided method for reducing fuel consumption during the taxiing of an aircraft having an on-board computer processor, a display, and a plurality of onboard propulsion means, whereby the aircraft is able to move over an airport taxi zone according to at least one specific taxiing procedure, the procedure being restricted by taxiing conditions and defined taxiing directives for moving the aircraft by means of a reduced portion of the onboard propulsion means, the method comprising the following steps:

checking of the taxiing conditions for implementation of the taxiing procedure and calculation of the implementation parameters of the procedure, the parameters comprising taxiing time according to the specific taxiing procedure;

calculating taxiing performance data resulting from the implementation of the taxiing procedure, the performance data comprising an amount of reduced fuel consumption of the aircraft as a function of the taxiing time;

displaying the taxiing directives and the taxiing performance data related to the taxiing procedure;

automatically controlling the propulsion means to operate in accordance with the implemented taxiing procedure; and monitoring the parameters of the avionics systems of the aircraft during the implementation of the taxiing procedure.

8. A computer-aided method for reducing fuel consumption during the taxiing of an aircraft having an on-board computer processor, a display, and a plurality of onboard propulsion means, whereby the aircraft is able to move over an airport taxi zone according to at least one specific taxiing procedure, the procedure being restricted by taxiing conditions and defined taxiing directives for moving the aircraft by means of a reduced portion of the onboard propulsion means, the method comprising the following steps:

checking of the taxiing conditions for implementation of the taxiing procedure and calculation of the implementation parameters of the procedure, the parameters comprising taxiing time according to the specific taxiing procedure;

calculating taxiing performance data resulting from the implementation of the taxiing procedure, the performance data comprising an amount of reduced fuel consumption of the aircraft as a function of the taxiing time;

determining a minimum operating time of the onboard propulsion means before a takeoff procedure or after a landing procedure, wherein the minimum operation time is to provide a threshold in cost savings for reducing the aircraft's fuel consumption on the ground;

rendering on a display screen for a user the taxiing directives and the taxiing performance data related to the taxiing procedure;

monitoring the parameters of the avionics systems of the aircraft during the implementation of the taxiing procedure; and rendering on a display screen for a user the minimum operating time, the taxiing directives and the taxiing performance data related to the taxiing procedure.

9. Method according to claim 1, 7, or 8, whereby the aircraft is able to move over an airport taxi zone by a reduced portion of a propulsion means external to the aircraft.

* * * * *